(12) United States Patent
Yun et al.

(10) Patent No.: US 11,404,738 B2
(45) Date of Patent: Aug. 2, 2022

(54) BATTERY PACK

(71) Applicant: LG Chem, Ltd., Seoul (KR)

(72) Inventors: Jin-Chul Yun, Daejeon (KR); Jin-Hak Kong, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 246 days.

(21) Appl. No.: 16/072,400

(22) PCT Filed: Sep. 20, 2017

(86) PCT No.: PCT/KR2017/010339
§ 371 (c)(1),
(2) Date: Jul. 24, 2018

(87) PCT Pub. No.: WO2018/062760
PCT Pub. Date: Apr. 5, 2018

(65) Prior Publication Data
US 2019/0027721 A1 Jan. 24, 2019

(30) Foreign Application Priority Data
Sep. 29, 2016 (KR) .......................... 10-2016-0125901

(51) Int. Cl.
*H01M 50/20* (2021.01)
*H01M 50/24* (2021.01)
(Continued)

(52) U.S. Cl.
CPC .......... *H01M 50/20* (2021.01); *H01M 50/24* (2021.01); *H01M 50/258* (2021.01);
(Continued)

(58) Field of Classification Search
CPC ... H01M 2/0245; H01M 50/20; H01M 50/502
See application file for complete search history.

(56) References Cited

U.S. PATENT DOCUMENTS 5,800,942 A * 9/1998 Hamada .................. B60K 1/04
429/120
6,152,776 A * 11/2000 Ikeda .................... H01M 2/206
439/627
(Continued)

FOREIGN PATENT DOCUMENTS

JP 2001-185103 A 7/2001
JP 2001-325996 A 11/2001
(Continued)

OTHER PUBLICATIONS

International Search Report and Written Opinion for Application No. PCT/KR2017/010339, dated Jan. 12, 2018 (10 pages) (with English translation of search report).
(Continued)

*Primary Examiner* — Sadie White
(74) *Attorney, Agent, or Firm* — Morgan, Lewis & Bockius LLP

(57) ABSTRACT

A battery pack is provided. The battery pack includes: a plurality of battery modules mutually connected by a bus bar; a mold assembly including a module receiver configured to receive the battery module; and a pack case configured to receive the mold assembly.

20 Claims, 5 Drawing Sheets

(51) Int. Cl.
  *H01M 50/50* (2021.01)
  *H01M 50/258* (2021.01)
  *H01M 50/502* (2021.01)

(52) U.S. Cl.
  CPC .......... *H01M 50/50* (2021.01); *H01M 50/502* (2021.01); *H01M 2220/20* (2013.01)

(56) References Cited

U.S. PATENT DOCUMENTS

| | | | |
|---|---|---|---|
| 6,340,877 B1 | 1/2002 | Mita et al. | |
| 6,399,238 B1* | 6/2002 | Oweis | H01M 10/643 |
| | | | 429/99 |
| 7,948,207 B2 | 5/2011 | Scheucher | |
| 2001/0046624 A1 | 11/2001 | Goto et al. | |
| 2003/0170535 A1 | 9/2003 | Watanabe et al. | |
| 2004/0185339 A1* | 9/2004 | Jones | H01M 10/484 |
| | | | 429/177 |
| 2006/0040173 A1* | 2/2006 | Shimamura | H01M 50/20 |
| | | | 429/99 |
| 2006/0093899 A1 | 5/2006 | Jeon et al. | |
| 2008/0217209 A1 | 9/2008 | Shimoyama | |
| 2009/0053591 A1* | 2/2009 | Ikeda | H01M 50/20 |
| | | | 429/159 |
| 2010/0124693 A1* | 5/2010 | Kosugi | H01M 10/482 |
| | | | 429/92 |
| 2011/0151314 A1* | 6/2011 | Ogawa | H01M 10/613 |
| | | | 429/158 |
| 2011/0195284 A1* | 8/2011 | Yasui | H01M 50/20 |
| | | | 429/82 |
| 2011/0274951 A1* | 11/2011 | Yasui | H01M 50/20 |
| | | | 429/53 |
| 2012/0003505 A1* | 1/2012 | Kim | H01M 10/425 |
| | | | 429/7 |
| 2012/0125447 A1* | 5/2012 | Fuhr | H01M 2/043 |
| | | | 137/260 |
| 2012/0301747 A1* | 11/2012 | Han | H01M 10/658 |
| | | | 429/7 |
| 2013/0143074 A1 | 6/2013 | Kim | |
| 2014/0017533 A1 | 1/2014 | Nishihara et al. | |
| 2014/0139185 A1* | 5/2014 | Han | H01M 50/578 |
| | | | 320/118 |
| 2014/0205889 A1* | 7/2014 | Kim | H01M 50/543 |
| | | | 429/158 |
| 2014/0353057 A1 | 12/2014 | Adachi | |
| 2015/0207131 A1* | 7/2015 | Han | H01M 50/20 |
| | | | 429/61 |
| 2015/0214583 A1* | 7/2015 | Lim | H01M 10/486 |
| | | | 429/90 |
| 2015/0303421 A1 | 10/2015 | Tazawa et al. | |
| 2016/0133890 A1 | 5/2016 | Lee et al. | |
| 2016/0141571 A1 | 5/2016 | Adachi et al. | |

FOREIGN PATENT DOCUMENTS

| | | |
|---|---|---|
| JP | 2002-134078 A | 5/2002 |
| JP | 2004-031248 A | 1/2004 |
| JP | 2004-087438 A | 3/2004 |
| JP | 2006-128122 A | 5/2006 |
| JP | 2015-204262 A | 11/2015 |
| JP | 2016-009585 A | 1/2016 |
| JP | 2016-081761 A | 5/2016 |
| KR | 10-2008-0082267 A | 9/2008 |
| KR | 10-2015-0015169 A | 2/2015 |
| WO | 2012/131809 A1 | 10/2012 |
| WO | 2013/129117 A1 | 9/2013 |

OTHER PUBLICATIONS

Office Action dated Dec. 7, 2020, issued in corresponding Japanese Patent Application No. 2018-539293.
Office Action dated Mar. 30, 2020, issued in corresponding Japanese Patent Application No. 2018-539293.

* cited by examiner

BATTERY PACK

The present application claims priority under 35 U.S.C. § 119 to Korean Patent Application No. 10-2016-0125901 filed on Sep. 29, 2016 in the Republic of Korea, and under 35 U.S.C. § 365 to PCT/KR2017/010339 filed on Sep. 20, 2017, the disclosures of which are incorporated herein by reference.

TECHNICAL FIELD

The present disclosure relates to a battery pack, and more particularly, to a battery pack having a strong structure against an impact by vibration.

BACKGROUND

In a battery pack for an electric automobile, battery modules including lithium-ion battery cells are fixed on a bottom surface of a battery pack case or fixed to a chassis through bolt fastening. Also, for serial/parallel connection between the plurality of battery modules, the battery pack has a structure in which terminals of each of adjacent battery modules are connected by a bus bar.

However, this battery pack structure is always exposed to an impact by vibration due to specialty that the battery pack is used for an automobile, and an impact by vibration applied from a chassis to the battery pack causes destruction of parts forming the battery pack.

Particularly, when an impact by vibration occurs, a fixing state between a bus bar connecting battery modules and a terminal of a battery module is easily loosened due to shaking of the battery modules, which brings about a defective battery pack.

Furthermore, since an electrode lead or an inner electrode assembly, etc. of each battery cell forming a battery module may be also destroyed when an impact by vibration continues, development of a technology which may reduce an impact by vibration is required.

SUMMARY

The present disclosure is designed to solve the problems of the related art, and therefore the present disclosure is directed to providing a battery pack structure which may remarkably reduce concern of part destruction by vibration without complicating the battery pack structure.

Technical objects of the present disclosure are not limited to the above object, and these and other objects and advantages of the present disclosure may be understood by those of ordinary skill in the art from the following detailed description.

In one aspect of the present disclosure, there is provided a battery pack including: a plurality of battery modules mutually connected by a bus bar; a mold assembly including a module receiver configured to receive the battery module; and a pack case configured to receive the mold assembly.

The battery module may include a plurality of battery cells.

The bus bar may connect external terminals provided to each of the plurality of battery modules.

The mold assembly may include: a main mold configured to receive the battery module; and a roof mold configured to cover an upper opening of the main mold.

The main mold may be fastened to the roof mold by a fastening bolt.

The module receiver may have a shape corresponding to the battery module.

The mold assembly may include a polymer resin.

According to one aspect of the present disclosure, occurrence of a defect of a battery pack may be remarkably reduced by reducing concern of part destruction by vibration while not reducing processability/productivity because a structure of the battery pack is not complicated.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an entire structure of a battery pack according to an embodiment of the present disclosure is described with reference to FIGS. 1 and 2.

Figure 1:
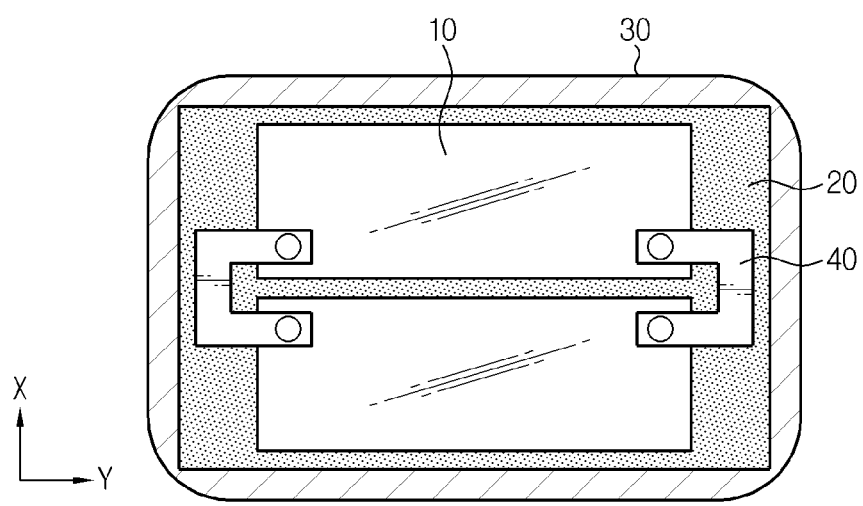
FIG. 1 is a plan view of an inside of a battery pack according to an embodiment of the present disclosure.
Figure 2:
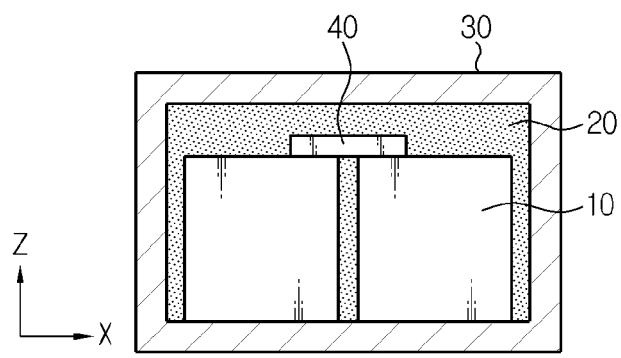
FIG. 2 is a front view of an inside of a battery pack according to an embodiment of the present disclosure.

FIG. 1 is a plan view of an inside of a battery pack according to an embodiment of the present disclosure, and FIG. 2 is a front view of an inside of a battery pack according to an embodiment of the present disclosure.

Referring to FIGS. 1 and 2, the battery pack according to an embodiment of the present disclosure includes a plurality of battery modules 10, a mold assembly 20, a pack case 30, and a bus bar 40.

The battery module 10 may be implemented in a form in which a plurality of battery cells are electrically connected and received inside a module case. For a battery cell applied to the battery module 10, a pouch type-lithium ion battery cell, for example, may be used.

The battery module 10 includes an external terminal electrically connected to battery cells provided therein and exposed to an outside of the module case, and external terminals of adjacent battery modules 10 are connected by the bus bar 40.

Meanwhile, electric connection between the plurality of battery modules 10 may be selectively performed among serial connection, parallel connection, and connection in which serial connection and parallel connection are mixed, in consideration of a voltage, a capacity, etc. required by the battery pack.

The mold assembly 20, which has received the battery modules 10, is received inside the pack case 30 and may include a polymer resin having excellent impact resistance such as polyethylene (PE), polypropylene (PP), or expanded polypropylene (EPP).

However, the above material is exemplary and the material of the mold assembly 20 according to the present disclosure is not limited thereto, and any material is applicable as long as the material is appropriate for reducing vibration transferred from the outside of the pack case 30.

A more detailed structure of the mold assembly 20 is described below with reference to FIGS. 3 to 5.

Figure 3:
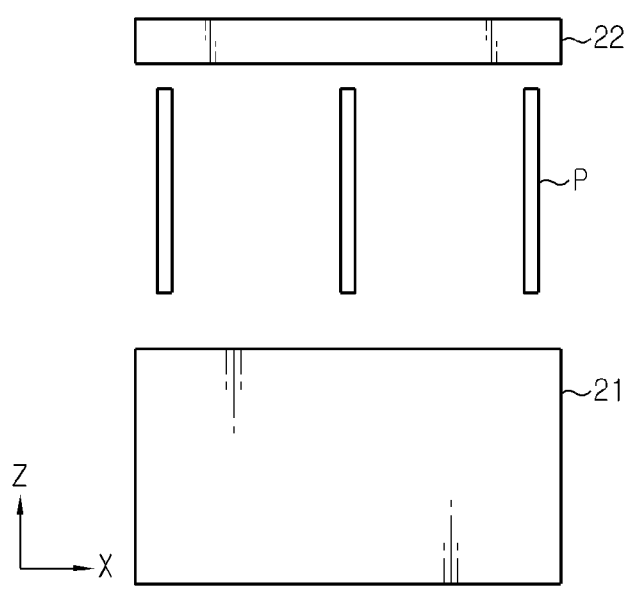
FIG. 3 is a view of a mold assembly applied to a battery pack according to an embodiment of the present disclosure.
Figure 4:
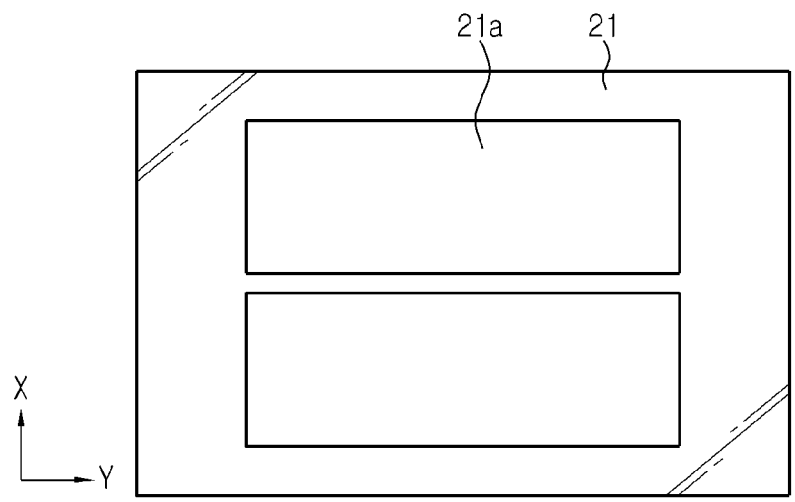
FIG. 4 is a view of an inner structure of a main mold applied to a battery pack according to an embodiment of the present disclosure.
Figure 5:
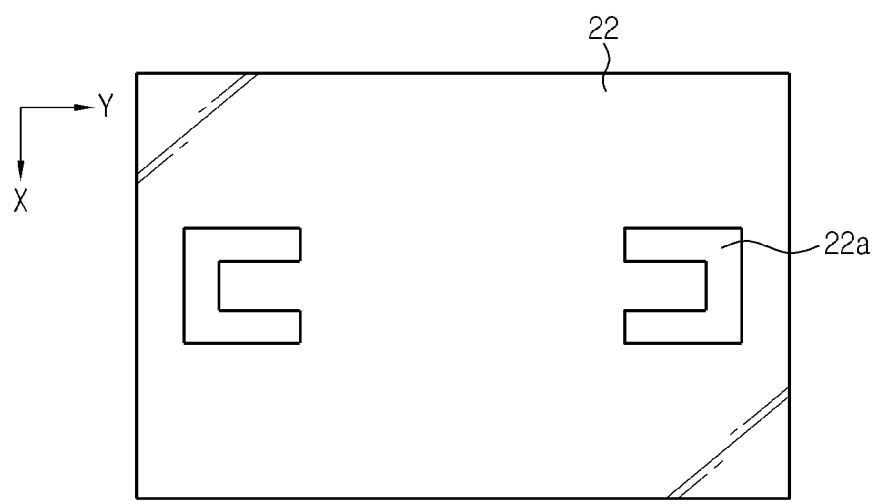
FIG. 5 is a view of an inner structure of a roof mold applied to a battery pack according to an embodiment of the present disclosure.

FIG. 3 is a view of a mold assembly applied to a battery pack according to an embodiment of the present disclosure, FIG. 4 is a view of an inner structure of a main mold applied to a battery pack according to an embodiment of the present disclosure, and FIG. 5 is a view of an inner structure of a roof mold applied to a battery pack according to an embodiment of the present disclosure.

First, referring to FIG. 3, the mold assembly 20 applied to the battery pack according to an embodiment of the present disclosure includes a main mold 21 configured to provide a space which may accommodate the battery module 10, and a roof mold 22 configured to finish the main mold 21 by covering an upper opening of the main mold 21.

Also, the main mold 21 and the roof mold 22 are individually provided such that the main mold 21 and the roof mold 22 are separable. The main mold 21 and the roof mold 22 are coupled to each other by a fastening means P such as a fastening bolt.

Next, the main mold 21 is described more specifically with reference to FIG. 4.

Referring to FIG. 4, the main mold 21 includes a module receiver 21a as many as the number of the battery modules 10 therein. The module receiver 21a has a shape/size corresponding to the battery module 10, and has a size in which the battery module 10 may be forcibly fitted in order to implement an efficient impact alleviation performance through a surface contact between the battery module 10 and an inner surface of the module receiver 21a.

In the case where the battery module 10 is forcibly fitted inside the module receiver 21a, a contact area between an outer surface of the battery module 10 and an inner surface of the module receiver 21a may be widened maximally. Therefore, an efficient impact reduction effect may be achieved with the battery module 10 not shaken inside the mold assembly 20.

Next, the roof mold 22 is described more specifically with reference to FIG. 5.

Referring to FIG. 5, the roof mold 22 includes a bus bar receiver 22a formed in a surface facing the main mold 21. The bus bar receiver 22a is formed as many as the number of bus bars 40 and has a shape/size corresponding to the bus bar 40. Like the module receiver 21a described above, the bus bar receiver 22a has a size in which the battery module 10 may be forcibly fitted in order to implement an efficient impact alleviation performance through a surface contact between the bus bar 40 and an inner surface of the bus bar receiver 22a.

In the case where the bus bar 40 is forcibly fitted inside the bus bar receiver 22a, a contact area between an outer surface of the battery module 10 and an inner surface of the bus bar receiver 22a may be widened maximally. Therefore, an efficient impact reduction effect may be achieved with the bus bar 40 not shaken inside the mold assembly 20.

As described above, in the case where individual movements of the battery module 10 and the bus bar 40 due to an impact transferred to the battery pack are suppressed, relative movements of the battery module 10 and the bus bar 40 are also remarkably reduced. Therefore, occurrence of a problem that a fastening portion of the bus bar 40 is destroyed and electrical connection between the battery modules 10 is cut off may be prevented.

Meanwhile, a battery pack according to an embodiment of the present disclosure may include at least one cooling hole formed in the mold assembly 20 in order to suppress a temperature rise due to heating of the battery module 10 while improving an impact resistance as described above. Also, in this case, the battery pack may include one or more cooling holes also in the pack case 30 in order to completely emit heat, which has been emitted to the outside of the mold assembly 20, to the outside of the battery pack.

Although the present disclosure has been described with reference to limited embodiments and drawings, the present disclosure is not limited thereto and it will be understood by those of ordinary skill in the art that various changes and modifications in form and details may be made within the scope of the present disclosure and equivalents as defined by the following claims.

What is claimed is:

1. A battery pack, comprising:
a plurality of battery modules mutually connected by at least one U-shaped bus bar;
a mold assembly configured to receive the plurality of battery modules; and
a pack case configured to receive the mold assembly,
wherein the mold assembly includes:
a main mold having a plurality of module receivers, each configured to receive a corresponding one of the plurality of battery modules, and
a roof mold configured to cover an upper opening of the main mold, the roof mold being separable from the main mold,
wherein the roof mold comprises a polymer resin,
wherein the roof mold includes at least one bus bar receiver having a same U-shape in a plan view as the at least one U-shaped bus bar,
wherein the at least one U-shaped bus bar is fitted into the U-shape of the at least one bus bar receiver, and
wherein top and side surfaces of the at least one U-shaped bus bar are in direct contact with the roof mold.

2. The battery pack of claim 1, wherein each of the plurality of battery modules comprises a plurality of battery cells.

3. The battery pack of claim 1, wherein the at least one U-shaped bus bar connects external terminals provided to each of the plurality of battery modules.

4. The battery pack of claim 1, wherein the main mold is fastened to the roof mold by a fastening bolt.

5. The battery pack of claim 1, wherein each of the module receivers has a shape and a size corresponding to the corresponding one of the battery modules.

6. The battery pack of claim 1, wherein the main mold comprises a polymer resin.

7. A battery pack, comprising:
a plurality of battery modules mutually connected by at least one U-shaped bus bar;
a mold assembly configured to receive the plurality of battery modules; and
a pack case configured to receive the mold assembly,
wherein the mold assembly includes:
a main mold having a plurality of module receivers, each configured to receive a corresponding one of the plurality of battery modules, and
a roof mold configured to cover an upper opening of the main mold, the roof mold being separable from the main mold,
wherein the main mold comprises a polymer resin,
wherein the roof mold includes at least one bus bar receiver having a same U-shape in a plan view as the at least one U-shaped bus bar,
wherein the at least one U-shaped bus bar is forcibly fitted into the U-shape of the at least one bus bar receiver, and
wherein top and side surfaces of the at least one U-shaped bus bar are in direct contact with the roof mold.

8. The battery pack of claim 7, wherein each of the plurality of battery modules comprises a plurality of battery cells.

9. The battery pack of claim 7, wherein the at least one U-shaped bus bar connects external terminals provided to each of the plurality of battery modules.

10. The battery pack of claim 7, wherein the main mold is fastened to the roof mold by a fastening bolt.

11. The battery pack of claim 7, wherein each of the module receivers has a shape and a size corresponding to the corresponding one of the battery modules.

12. The battery pack of claim 7, wherein the roof mold comprises a polymer resin.

13. The battery pack of claim 1, wherein:
the U-shape of the at least one U-shaped bus bar includes arms and a bottom that are coplanar, such that the bottom surface of the at least one U-shaped bus bar has the U-shape; and
a bottom surface of the arms of the U-shape of the at least one U-shaped bus bar that are in direct contact with the plurality of battery modules is coplanar with a bottom surface of the bottom of the U-shape of the at least one U-shaped bus bar.

14. The battery pack of claim 7, wherein:
the U-shape of the bus at least one U-shaped bar includes arms and a bottom that are coplanar, such that the bottom surface of the at least one U-shaped bus bar has the U-shape; and
a bottom surface of the arms of the U-shape of the at least one U-shaped bus bar that are in direct contact with the plurality of battery modules is coplanar with a bottom surface of the bottom of the U-shape of the at least one U-shaped bus bar.

15. The battery pack of claim 1, wherein the at least one bus bar receiver has the U-shape and a size corresponding to the at least one U-shaped bus bar, which is forcibly fitted into the at least one bus bar receiver.

16. The battery pack of claim 1, wherein the plurality of battery modules are separated from each other by the main mold and are connected to each other via the at least one U-shaped bus bar.

17. The battery pack of claim 5, wherein the plurality of battery modules are forcibly fitted into the plurality of module receivers, respectively.

18. The battery pack of claim 7, wherein the at least one bus bar receiver has the U-shape and a size corresponding to the at least one U-shaped bus bar, which is forcibly fitted into the at least one bus bar receiver.

19. The battery pack of claim 7, wherein the plurality of battery modules are separated from each other by the main mold and are connected to each other via the at least one U-shaped bus bar.

20. The battery pack of claim 11, wherein the plurality of battery modules are forcibly fitted into the plurality of module receivers, respectively.

* * * * *